United States Patent
Daoust et al.

(10) Patent No.: US 12,451,644 B2
(45) Date of Patent: Oct. 21, 2025

(54) COUPLER SEAL FOR COAXIAL CABLE SYSTEM COMPONENTS

(71) Applicant: PPC BROADBAND, INC., East Syracuse, NY (US)

(72) Inventors: Daniel Daoust, Syracuse, NY (US); Harold J. Watkins, Chittenango, NY (US); Steve Stankovski, Clay, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 18/230,359

(22) Filed: Aug. 4, 2023

(65) Prior Publication Data

US 2024/0079817 A1 Mar. 7, 2024

Related U.S. Application Data (63) Continuation of application No. 16/984,141, filed on Aug. 3, 2020, now Pat. No. 11,742,611.

(Continued)

(51) Int. Cl.
*H01R 13/52* (2006.01)
*F16J 15/02* (2006.01)
(Continued)

(52) U.S. Cl.
CPC ........ *H01R 13/5221* (2013.01); *F16J 15/022* (2013.01); *H01R 24/40* (2013.01); *H01R 2103/00* (2013.01)

(58) Field of Classification Search
CPC ............................ H01R 13/5221; H01R 24/40; H01R 2103/00; F16J 15/022
See application file for complete search history.

(56) References Cited

U.S. PATENT DOCUMENTS

| 5,454,675 A | 10/1995 | DeHaitre |
|---|---|---|
| 6,425,782 B1 | 7/2002 | Holland |

(Continued)

FOREIGN PATENT DOCUMENTS

WO 2016188692 A1 12/2016

OTHER PUBLICATIONS

Search Report dated Oct. 23, 2020 in corresponding PCT Application No. PCT/US20/44806, 4 pages.

(Continued)

*Primary Examiner* — Briggitte R. Hammond
(74) *Attorney, Agent, or Firm* — MH2 TECHNOLOGY LAW GROUP LLP (57) ABSTRACT

A seal configured to provide an enhanced seal between a connector and an interface port may include a seal portion that includes a separation portion and a sealing portion. The sealing portion may include a forward sealing portion and a rearward sealing portion. The sealing portion may be structurally configured to cooperate with a seal engaging port portion of an interface port and a seal engaging connector portion of a connector so as to provide a sealed connection portion between the sealing engaging port portion and the seal engaging connector portion even when the forward sealing portion is separated at the separation portion so as to maintain the sealed connection between the seal engaging port portion and the seal engaging connector portion and provide an enhanced port-connector seal even when the forward sealing portion no longer provides a seal between the connector and the interface port.

15 Claims, 7 Drawing Sheets

Related U.S. Application Data (60) Provisional application No. 62/881,523, filed on Aug. 1, 2019.

(51) Int. Cl.
 H01R 24/40 (2011.01)
 H01R 103/00 (2006.01)

(56) References Cited

U.S. PATENT DOCUMENTS

| | | |
|---|---|---|
| 6,621,005 B1 | 9/2003 | Lovec et al. |
| 7,311,555 B1 | 12/2007 | Burris et al. |
| 2007/0134967 A1 | 6/2007 | Montena |
| 2008/0139028 A1 | 6/2008 | Burris et al. |
| 2009/0291580 A1 | 11/2009 | Burris et al. |
| 2014/0220805 A1 | 8/2014 | Haberek |
| 2015/0295363 A1 | 10/2015 | Wang |

OTHER PUBLICATIONS

Written Opinion dated Oct. 23, 2020 in corresponding PCT Application No. PCT/US20/44806, 7 pages.

COUPLER SEAL FOR COAXIAL CABLE SYSTEM COMPONENTS

CROSS-REFERENCE TO RELATED APPLICATION

This application is a continuation of U.S. patent application Ser. No. 16/984,141 filed on Aug. 3, 2020, which claims the benefit of U.S. Provisional Application No. 62/881,523, filed on Aug. 1, 2019, both of which are hereby incorporated by reference herein in their entireties.

BACKGROUND

Embodiments of the invention relate generally to data transmission system components, and more particularly to a coupler seal for use with a connector of a coaxial cable system component for sealing a threaded port connection, and to a coaxial cable system component incorporating the seal assemblies.

Community antenna television (CATV) systems and many broadband data transmission systems rely on a network of coaxial cables to carry a wide range of radio frequency (RF) transmissions with low amounts of loss and distortion. A covering of plastic or rubber adequately seals an uncut length of coaxial cable from environmental elements such as water, salt, oil, dirt, etc. However, the cable must attach to other cables, components and/or to equipment (e.g., taps, filters, splitters and terminators) generally having threaded ports (hereinafter, "ports") for distributing or otherwise utilizing the signals carried by the coaxial cable. A service technician or other operator must frequently cut and prepare the end of a length of coaxial cable, attach the cable to a coaxial cable connector, or a connector incorporated in a coaxial cable system component, and install the connector on a threaded port. This is typically done in the field. Environmentally exposed (usually threaded) parts of the components and ports are susceptible to corrosion and contamination from environmental elements and other sources, as the connections are typically located outdoors, at taps on telephone poles, on customer premises, or in underground vaults. These environmental elements eventually corrode the electrical connections located in the connector and between the connector and mating components. The resulting corrosion reduces the efficiency of the affected connection, which reduces the signal quality of the RF transmission through the connector. Corrosion in the immediate vicinity of the connector-port connection is often the source of service attention, resulting in high maintenance costs.

Numerous methods and devices have been used to improve the moisture and corrosion resistance of connectors and connections. With some conventional methods and devices, operators may require additional training and vigilance to seal coaxial cable connections using rubber grommets or seals. An operator must first choose the appropriate seal for the application and then remember to place the seal onto one of the connective members prior to assembling the connection. Certain rubber seal designs seal only through radial compression. These seals must be tight enough to collapse onto or around the mating parts. Because there may be several diameters over which the seal must extend, the seal is likely to be very tight on at least one of the diameters. High friction caused by the tight seal may lead an operator to believe that the assembled connection is completely tightened when it actually remains loose. A loose connection may not efficiently transfer a quality RF signal causing problems similar to corrosion.

Other conventional seal designs require axial compression generated between the connector coupler and an opposing surface of the port. An appropriate length seal that sufficiently spans the distance between the coupler and the opposing surface, without being too long, must be selected. If the seal is too long, the seal may prevent complete assembly of the connector or component. Alternatively, if the seal is too long, the seal compresses axially like an accordion. The accordion effect is satisfactory for a moisture seal, but is not good for shielding. Further, some conventional seals may include a nickel-graphite filler, which tends to separate with the accordion effect. Furthermore, the accordion effect may cause a portion of the sealing surface of the seal to lift from the opposing surface of the port. On the other hand, if the seal is too short, moisture freely passes. The seal selection is made more complicated because port lengths may vary among different manufacturers.

More recently, conventional interface ports are being made shorter rather than longer. In such situations, technicians may remove the weather tight seal from the front of the connector, or technicians may cut the axial length of the weather tight seal to more closely match an axial length of the interface port. In either case, the sealing quality of the connector is reduced or eliminated.

In view of the aforementioned shortcomings and others known by those skilled in the art, it may be desirable to provide a seal, seal assembly, and/or a sealing connector that addresses these shortcomings and provides other advantages and efficiencies.

SUMMARY

According to various embodiments of the disclosure, a cable system component includes a housing having a seal-grasping surface portion and a seal having an elastically deformable tubular body attached to the housing. The body has a posterior sealing surface that cooperatively engages the seal-grasping surface portion of the housing and a forward sealing surface configured to cooperatively engage an interface port. The forward sealing surface includes a radially inner facet divided into a forward portion and a rearward portion by an inner annular groove in the inner facet. The seal includes an anterior portion and a posterior portion connected by a neck portion radially aligned with the inner annular groove, the forward portion of the radially inner facet is on the anterior portion, and the rearward portion of the radially inner facet is on the posterior portion. The forward portion of the radially inner facet includes a first sealing edge, and the rearward portion of the radially inner facet includes a second sealing edge. The first sealing edge and the second sealing edge are configured to cooperate with the outer surface of the interface port in order to provide a sealed connection between the connector and the port. The second sealing edge surface is configured to cooperate with the outer surface of the interface port in order to provide a sealed connection between the connector and the port when the anterior portion is removed from the seal, and the inner annular groove is radially aligned with the neck portion and is configured to keep the neck portion away from the sealing edge of the rearward portion of the radially inner facet when the anterior portion is removed from the seal.

According to some aspects of the component, an outer surface of the seal includes an outer annular groove that is aligned with the inner annular groove in a radial direction of the tubular body of the seal. The anterior portion of the seal may be configured to be separated from the posterior portion of the seal by cutting or tearing the neck portion in a radial direction along the outer annular groove and the inner annular groove.

According to some aspects of the component, the rearward portion of the radially inner facet includes a continuous rounded annular surface.

In accordance with various embodiments of the disclosure, a seal is configured to be coupled with a coaxial cable connector and to form a seal with an interface port. The seal includes an elastically deformable tubular body having a posterior sealing surface configured to engage a seal-grasping surface portion of the connector and a forward sealing surface configured to cooperatively engage the interface port. The forward sealing surface includes a radially inner facet divided into a forward portion and a rearward portion by an inner annular groove in the inner facet. The seal includes an anterior portion and a posterior portion connected by a thinned neck portion, the forward portion of the radially inner facet is on the anterior portion, and the rearward portion of the radially inner facet is on the posterior portion. The forward portion of the radially inner facet includes a first sealing edge, and the rearward portion of the radially inner facet includes a second sealing edge. The first sealing edge and the second sealing edge are configured to cooperate with the outer surface of the interface port in order to provide a sealed connection between the connector and the port. The second sealing edge surface is configured to cooperate with the outer surface of the interface port in order to provide a sealed connection between the connector and the port when the anterior portion is removed from the seal, and the inner annular groove is radially aligned with the neck portion and is configured to keep the neck portion away from the sealing edge of the rearward portion of the radially inner facet when the anterior portion is removed from the seal.

According to various aspects of the seal, an outer surface of the seal includes an outer annular groove that is aligned with the inner annular groove in a radial direction of the tubular body of the seal. The anterior portion of the seal may be configured to be separated from the posterior portion of the seal by cutting or tearing the neck portion in a radial direction along the outer annular groove and the inner annular groove.

According to various aspects of the seal, the rearward portion of the radially inner facet includes a continuous rounded annular surface.

According to various aspects of the seal, a first axial length from a rearward end of the rearward portion to a forward end of the forward portion of the radially inner facet is configured to be less than or equal to a first axial length of a first interface port, the first axial length is configured to be greater than a second axial length of a second interface port, and a second axial length from a rearward end of the rearward portion to a forward end of the rearward portion of the radially inner facet is configured to be less than or equal to a first axial length of a first interface port.

According to various embodiments of disclosure, as seal includes an elastically deformable tubular body having a forward sealing surface configured to cooperatively engage an interface port. The forward sealing surface includes a radially inner facet divided into a forward portion and a rearward portion by an inner annular groove in the inner facet that forms a neck portion of the tubular body. The forward portion of the radially inner facet includes a first sealing edge, and the rearward portion of the radially inner facet includes a second sealing edge. The first sealing edge and the second sealing edge are configured to cooperate with the outer surface of the interface port in order to provide a sealed connection between the connector and the port. The second sealing edge surface is configured to cooperate with the outer surface of the interface port in order to provide a sealed connection between the connector and the port when the anterior portion is removed from the seal.

According to various aspects of the seal, an outer surface of the seal includes an outer annular groove that is aligned with the inner annular groove in a radial direction of the tubular body of the seal. The anterior portion of the seal may be configured to be separated from the posterior portion of the seal by cutting or tearing the neck portion in a radial direction along the outer annular groove and the inner annular groove.

According to various aspects of the seal, the rearward portion of the radially inner facet includes a continuous rounded annular surface.

According to various aspects of the seal, the neck portion is configured to be radially spaced from the interface port when the anterior portion is removed from the seal.

According to various aspects of the seal, the forward portion of the radially inner facet and the rearward portion of the radially inner facet have a same inner diameter along their lengths.

According to various aspects of the seal, a first axial length from a rearward end of the rearward portion to a forward end of the forward portion of the radially inner facet is configured to be less than or equal to a first axial length of a first interface port, the first axial length is configured to be greater than a second axial length of a second interface port, and a second axial length from a rearward end of the rearward portion to a forward end of the rearward portion of the radially inner facet is configured to be less than or equal to a first axial length of a first interface port.

BRIEF DESCRIPTION OF THE DRAWINGS

Features and advantages of the present disclosure are described in, and will be apparent from, the following Brief Description of the Drawings and Detailed Description.

DETAILED DESCRIPTION OF EMBODIMENTS

Embodiments of the invention are directed to a seal assembly for use with a coaxial cable system component and to a coaxial cable system component including a seal assembly in accordance with the described embodiments. Throughout the description, like reference numerals will refer to like parts in the various drawing figures. As a preface to the detailed description, it should be noted that, as used in this specification and the appended claims, the singular forms "a," "an," and "the" include plural referents, unless the context clearly dictates otherwise.

For ease of description, the coaxial cable system components such as connectors, termination devices, filters and the like, referred to and illustrated herein will be of a type and form suited for connecting a coaxial cable or component, used for CATV or other data transmission, to an externally threaded port having a 3/8 inch-32 UNEF 2A thread. Those skilled in the art will appreciate, however, that many system components include a rotatable, internally threaded coupler that attaches the component to a typical externally threaded port, the specific size, shape and component details may vary in ways that do not impact the invention per se, and which are not part of the invention per se. Likewise, the externally threaded portion of the port may vary in dimension (diameter and length) and configuration. For example, a port may be referred to as a "short" port where the connecting portion has a length of about 0.325 inches. A "long" port may have a connecting length of about 0.500 inches. All of the connecting portion of the port may be threaded, or there may be an unthreaded shoulder immediately adjacent the threaded portion, for example. In all cases, the component and port must cooperatively engage. According to the embodiments of the present invention, a sealing relationship is provided for the otherwise exposed region between the component connector and the externally threaded portion of the port.

Figure 1:
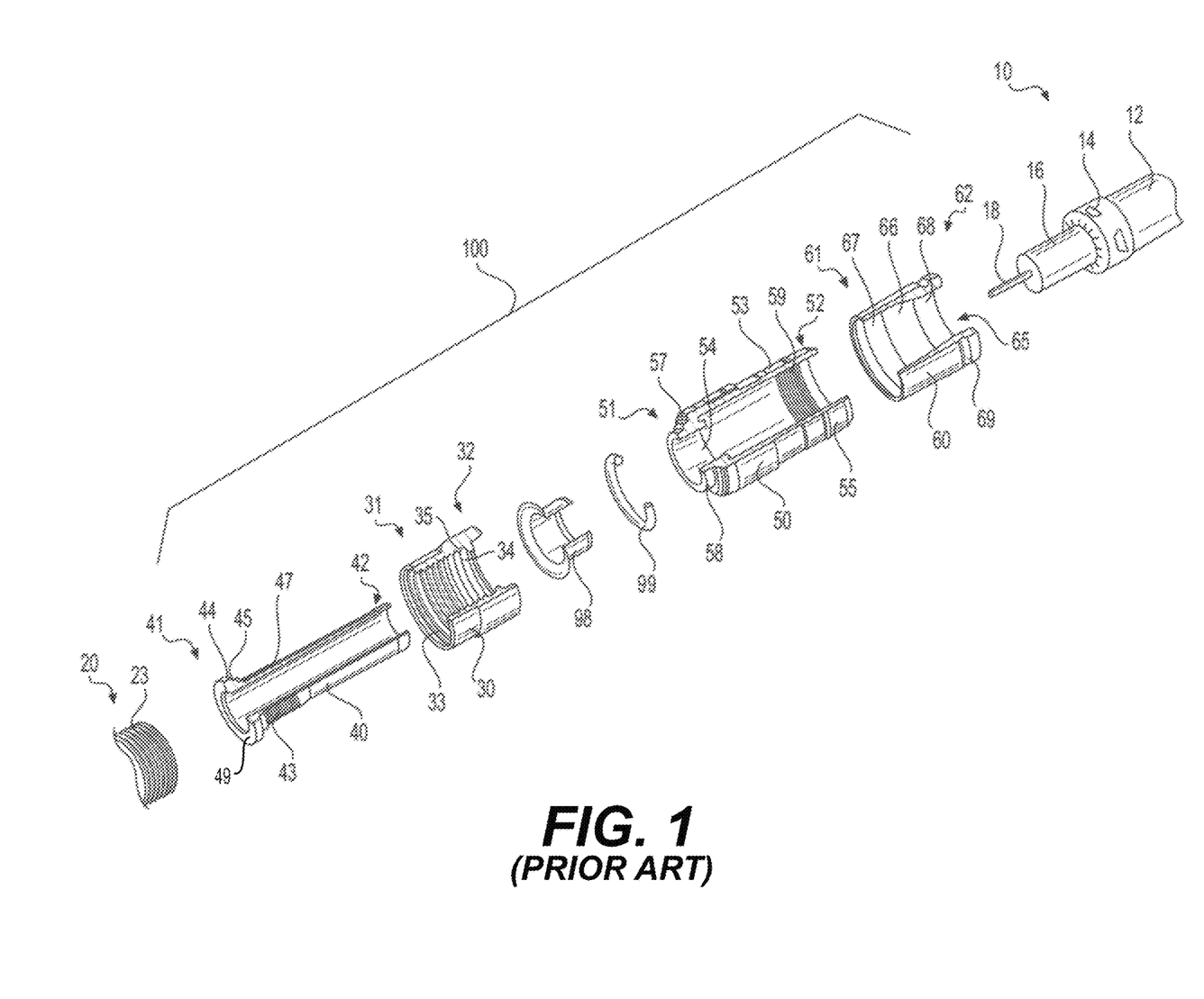
FIG. 1 is an exploded perspective cut-away view of a conventional coaxial cable connector.

Referring to the drawings, FIG. 1 depicts a conventional coaxial cable connector 100. The coaxial cable connector 100 may be operably affixed, or otherwise functionally attached, to a coaxial cable 10 having a protective outer jacket 12, a conductive grounding shield 14, an interior dielectric 16 and a center conductor 18. The coaxial cable 10 may be prepared as embodied in FIG. 1 by removing the protective outer jacket 12 and drawing back the conductive grounding shield 14 to expose a portion of the interior dielectric 16. Further preparation of the embodied coaxial cable 10 may include stripping the dielectric 16 to expose a portion of the center conductor 18. The protective outer jacket 12 is intended to protect the various components of the coaxial cable 10 from damage which may result from exposure to dirt or moisture and from corrosion. Moreover, the protective outer jacket 12 may serve in some measure to secure the various components of the coaxial cable 10 in a contained cable design that protects the cable 10 from damage related to movement during cable installation. The conductive grounding shield 14 may be comprised of conductive materials suitable for providing an electrical ground connection, such as cuprous braided material, aluminum foils, thin metallic elements, or other like structures. Various embodiments of the shield 14 may be employed to screen unwanted noise. For instance, the shield 14 may comprise a metal foil wrapped around the dielectric 16, or several conductive strands formed in a continuous braid around the dielectric 16. Combinations of foil and/or braided strands may be utilized wherein the conductive shield 14 may comprise a foil layer, then a braided layer, and then a foil layer. Those in the art will appreciate that various layer combinations may be implemented in order for the conductive grounding shield 14 to effectuate an electromagnetic buffer helping to prevent ingress of environmental noise that may disrupt broadband communications. The dielectric 16 may be comprised of materials suitable for electrical insulation, such as plastic foam material, paper materials, rubber-like polymers, or other functional insulating materials. It should be noted that the various materials of which all the various components of the coaxial cable 10 are comprised should have some degree of elasticity allowing the cable 10 to flex or bend in accordance with traditional broadband communication standards, installation methods and/or equipment. It should further be recognized that the radial thickness of the coaxial cable 10, protective outer jacket 12, conductive grounding shield 14, interior dielectric 16 and/or center conductor 18 may vary based upon generally recognized parameters corresponding to broadband communication standards and/or equipment.

Referring further to FIG. 1, the connector 100 may be configured to be coupled with a coaxial cable interface port 20. The coaxial cable interface port 20 includes a conductive receptacle for receiving a portion of a coaxial cable center conductor 18 sufficient to make adequate electrical contact. The coaxial cable interface port 20 may further comprise a threaded exterior surface 23. It should be recognized that the radial thickness and/or the length of the coaxial cable interface port 20 and/or the conductive receptacle of the port 20 may vary based upon generally recognized parameters corresponding to broadband communication standards and/or equipment. Moreover, the pitch and height of threads which may be formed upon the threaded exterior surface 23 of the coaxial cable interface port 20 may also vary based upon generally recognized parameters corresponding to broadband communication standards and/or equipment. Furthermore, it should be noted that the interface port 20 may be formed of a single conductive material, multiple conductive materials, or may be configured with both conductive and non-conductive materials corresponding to the port's operable electrical interface with the connector 100. However, the receptacle of the port 20 should be formed of a conductive material, such as a metal, like brass, copper, or aluminum. Further still, it will be understood by those of ordinary skill that the interface port 20 may be embodied by a connective interface component of a coaxial cable communications device, a television, a modem, a computer port, a network receiver, or other communications modifying devices such as a signal splitter, a cable line extender, a cable network module and/or the like.

Referring still further to FIG. 1, the conventional coaxial cable connector 100 may include a coupler, for example, threaded coupler 30, a post 40, a connector body 50, a fastener member 60, a grounding member 98 formed of conductive material, and a connector body sealing member 99, such as, for example, a body O-ring configured to fit around a portion of the connector body 50. The coupler 30 at the front end of the post 40 serves to attach the connector 100 to an interface port.

The threaded coupler 30 of the coaxial cable connector 100 has a first forward end 31 and opposing second rearward end 32. The threaded coupler 30 may comprise internal threading 33 extending axially from the edge of first forward end 31 a distance sufficient to provide operably effective threadable contact with the external threads 23 of the standard coaxial cable interface port 20. The threaded coupler 30 includes an internal lip 34, such as an annular protrusion, located proximate the second rearward end 32 of the coupler. The internal lip 34 includes a surface 35 facing the first forward end 31 of the coupler 30. The forward facing surface 35 of the lip 34 may be a tapered surface or side facing the first forward end 31 of the coupler 30. The structural configuration of the coupler 30 may vary according to differing connector design parameters to accommodate different functionality of a coaxial cable connector 100. For instance, the first forward end 31 of the coupler 30 may include internal and/or external structures such as ridges, grooves, curves, detents, slots, openings, chamfers, or other structural features, etc., which may facilitate the operable joining of an environmental sealing member, such a watertight seal or other attachable component element, that may help prevent ingress of environmental contaminants, such as moisture, oils, and dirt, at the first forward end 31 of a coupler 30, when mated with the interface port 20. Moreover, the second rearward end 32 of the coupler 30 may extend a significant axial distance to reside radially extent, or otherwise partially surround, a portion of the connector body 50, although the extended portion of the coupler 30 need not contact the connector body 50. The threaded coupler 30 may be formed of conductive materials, such as copper, brass, aluminum, or other metals or metal alloys, facilitating grounding through the coupler 30. Accordingly, the coupler 30 may be configured to extend an electromagnetic buffer by electrically contacting conductive surfaces of an interface port 20 when a connector 100 is advanced onto the port 20. In addition, the threaded coupler 30 may be formed of both conductive and non-conductive materials. For example, the external surface of the coupler 30 may be formed of a polymer, while the remainder of the coupler 30 may be comprised of a metal or other conductive material. The threaded coupler 30 may be formed of metals or polymers or other materials that would facilitate a rigidly formed coupler body. Manufacture of the threaded coupler 30 may include casting, extruding, cutting, knurling, turning, tapping, drilling, injection molding, blow molding, combinations thereof, or other fabrication methods that may provide efficient production of the component. The forward facing surface 35 of the coupler 30 faces a flange 44 of the post 40 when operably assembled in a connector 100, so as to allow the coupler to rotate with respect to the other component elements, such as the post 40 and the connector body 50, of the connector 100.

Referring still to FIG. 1, the connector 100 may include a post 40. The post 40 may include a first forward end 41 and an opposing second rearward end 42. Furthermore, the post 40 may include a flange 44, such as an externally extending annular protrusion, located at the first end 41 of the post 40. The flange 44 includes a rearward facing surface 45 that faces the forward facing surface 35 of the coupler 30, when operably assembled in a coaxial cable connector 100, so as to allow the coupler to rotate with respect to the other component elements, such as the post 40 and the connector body 50, of the connector 100. The rearward facing surface 45 of flange 44 may be a tapered surface facing the second rearward end 42 of the post 40. Further still, an embodiment of the post 40 may include a surface feature 47 such as a lip or protrusion that may engage a portion of a connector body 50 to secure axial movement of the post 40 relative to the connector body 50. However, the post need not include such a surface feature 47, and the coaxial cable connector 100 may rely on press-fitting and friction-fitting forces and/or other component structures having features and geometries to help retain the post 40 in secure location both axially and rotationally relative to the connector body 50. The location proximate or near where the connector body is secured relative to the post 40 may include surface features 43, such as ridges, grooves, protrusions, or knurling, which may enhance the secure attachment and locating of the post 40 with respect to the connector body 50. Moreover, the portion of the post 40 that contacts embodiments of a continuity member 98 may be of a different diameter than a portion of the coupler 30 that contacts the connector body 50. Such diameter variance may facilitate assembly processes. For instance, various components having larger or smaller diameters can be readily press-fit or otherwise secured into connection with each other. Additionally, the post 40 may include a mating edge 46, which may be configured to make physical and electrical contact with a corresponding mating edge 26 of the interface port 20. The post 40 should be formed such that portions of a prepared coaxial cable 10 including the dielectric 16 and center conductor 18 may pass axially into the second end 42 and/or through a portion of the tube-like body of the post 40. Moreover, the post 40 should be dimensioned, or otherwise sized, such that the post 40 may be inserted into an end of the prepared coaxial cable 10, around the dielectric 16 and under the protective outer jacket 12 and conductive grounding shield 14. Accordingly, where an embodiment of the post 40 may be inserted into an end of the prepared coaxial cable 10 under the drawn back conductive grounding shield 14, substantial physical and/or electrical contact with the shield 14 may be accomplished thereby facilitating grounding through the post 40. The post 40 should be conductive and may be formed of metals or may be formed of other conductive materials that would facilitate a rigidly formed post body. In addition, the post may be formed of a combination of both conductive and non-conductive materials. For example, a metal coating or layer may be applied to a polymer of other non-conductive material. Manufacture of the post 40 may include casting, extruding, cutting, turning, drilling, knurling, injection molding, spraying, blow molding, component overmolding, combinations thereof, or other fabrication methods that may provide efficient production of the component.

The coaxial cable connector 100 may include a connector body 50. The connector body 50 may comprise a first end 51 and opposing second end 52. Moreover, the connector body may include a post mounting portion 57 proximate or otherwise near the first end 51 of the body 50, the post mounting portion 57 configured to securely locate the body 50 relative to a portion of the outer surface of post 40, so that the connector body 50 is axially secured with respect to the post 40, in a manner that prevents the two components from moving with respect to each other in a direction parallel to the axis of the connector 100. The internal surface of the post mounting portion 57 may include an engagement feature 54 that facilitates the secure location of the continuity member 98 with respect to the connector body 50 and/or the post 40, by physically engaging the continuity member 98 when assembled within the connector 100. The engagement feature 54 may simply be an annular detent or ridge having a different diameter than the rest of the post mounting portion 57. However other features such as grooves, ridges, protrusions, slots, holes, keyways, bumps, nubs, dimples, crests, rims, or other like structural features may be included to facilitate or possibly assist the positional retention of embodiments of the electrical continuity member 98 with respect to the connector body 50. Nevertheless, embodiments of the continuity member 98 may also reside in a secure position with respect to the connector body 50 simply through press-fitting and friction-fitting forces engendered by corresponding tolerances, when the various coaxial cable connector 100 components are operably assembled, or otherwise physically aligned and attached together. Various exemplary continuity members 98 are illustrated and described in U.S. Pat. No. 8,287,320, the disclosure of which is incorporated herein by reference. In addition, the connector body 50 may include an outer annular recess 58 located proximate or near the first end 51 of the connector body 50. Furthermore, the connector body 50 may include a semi-rigid, yet compliant outer surface 55, wherein an inner surface opposing the outer surface 55 may be configured to form an annular seal when the second end 52 is deformably compressed against a received coaxial cable 10 by operation of a fastener member 60. The connector body 50 may include an external annular detent 53 located proximate or close to the second end 52 of the connector body 50. Further still, the connector body 50 may include internal surface features 59, such as annular serrations formed near or proximate the internal surface of the second end 52 of the connector body 50 and configured to enhance frictional restraint and gripping of an inserted and received coaxial cable 10, through tooth-like interaction with the cable. The connector body 50 may be formed of materials such as plastics, polymers, bendable metals or composite materials that facilitate a semi-rigid, yet compliant outer surface 55. Further, the connector body 50 may be formed of conductive or non-conductive materials or a combination thereof. Manufacture of the connector body 50 may include casting, extruding, cutting, turning, drilling, knurling, injection molding, spraying, blow molding, component overmolding, combinations thereof, or other fabrication methods that may provide efficient production of the component.

With further reference to FIG. 1, the coaxial cable connector 100 may include a fastener member 60. The fastener member 60 may have a first end 61 and opposing second end 62. In addition, the fastener member 60 may include an internal annular protrusion 63 located proximate the first end 61 of the fastener member 60 and configured to mate and achieve purchase with the annular detent 53 on the outer surface 55 of connector body 50. Moreover, the fastener member 60 may comprise a central passageway 65 defined between the first end 61 and second end 62 and extending axially through the fastener member 60. The central passageway 65 may comprise a ramped surface 66 which may be positioned between a first opening or inner bore 67 having a first diameter positioned proximate with the first end 61 of the fastener member 60 and a second opening or inner bore 68 having a second diameter positioned proximate with the second end 62 of the fastener member 60. The ramped surface 66 may act to deformably compress the outer surface 55 of a connector body 50 when the fastener member 60 is operated to secure a coaxial cable 10. For example, the narrowing geometry will compress squeeze against the cable, when the fastener member is compressed into a tight and secured position on the connector body. Additionally, the fastener member 60 may comprise an exterior surface feature 69 positioned proximate with or close to the second end 62 of the fastener member 60. The surface feature 69 may facilitate gripping of the fastener member 60 during operation of the connector 100. Although the surface feature 69 is shown as an annular detent, it may have various shapes and sizes such as a ridge, notch, protrusion, knurling, or other friction or gripping type arrangements. The first end 61 of the fastener member 60 may extend an axial distance so that, when the fastener member 60 is compressed into sealing position on the coaxial cable 100, the fastener member 60 touches or resides substantially proximate significantly close to the coupler 30. It should be recognized, by those skilled in the requisite art, that the fastener member 60 may be formed of rigid materials such as metals, hard plastics, polymers, composites and the like, and/or combinations thereof. Furthermore, the fastener member 60 may be manufactured via casting, extruding, cutting, turning, drilling, knurling, injection molding, spraying, blow molding, component overmolding, combinations thereof, or other fabrication methods that may provide efficient production of the component.

The manner in which the coaxial cable connector 100 may be fastened to a received coaxial cable 10 may also be similar to the way a cable is fastened to a common CMP-type connector having an insertable compression sleeve that is pushed into the connector body 50 to squeeze against and secure the cable 10. The coaxial cable connector 100 includes an outer connector body 50 having a first end 51 and a second end 52. The body 50 at least partially surrounds a tubular inner post 40. The tubular inner post 40 has a first end 41 including a flange 44 and a second end 42 configured to mate with a coaxial cable 10 and contact a portion of the outer conductive grounding shield or sheath 14 of the cable 10. The connector body 50 is secured relative to a portion of the tubular post 40 proximate or close to the first end 41 of the tubular post 40 and cooperates, or otherwise is functionally located in a radially spaced relationship with the inner post 40 to define an annular chamber with a rear opening. A tubular locking compression member may protrude axially into the annular chamber through its rear opening. The tubular locking compression member may be slidably coupled or otherwise movably affixed to the connector body 50 to compress into the connector body and retain the cable 10 and may be displaceable or movable axially or in the general direction of the axis of the connector 100 between a first open position (accommodating insertion of the tubular inner post 40 into a prepared cable 10 end to contact the grounding shield 14), and a second clamped position compressibly fixing the cable 10 within the chamber of the connector 100, because the compression sleeve is squeezed into retaining contact with the cable 10 within the connector body 50.

Figure 2A:
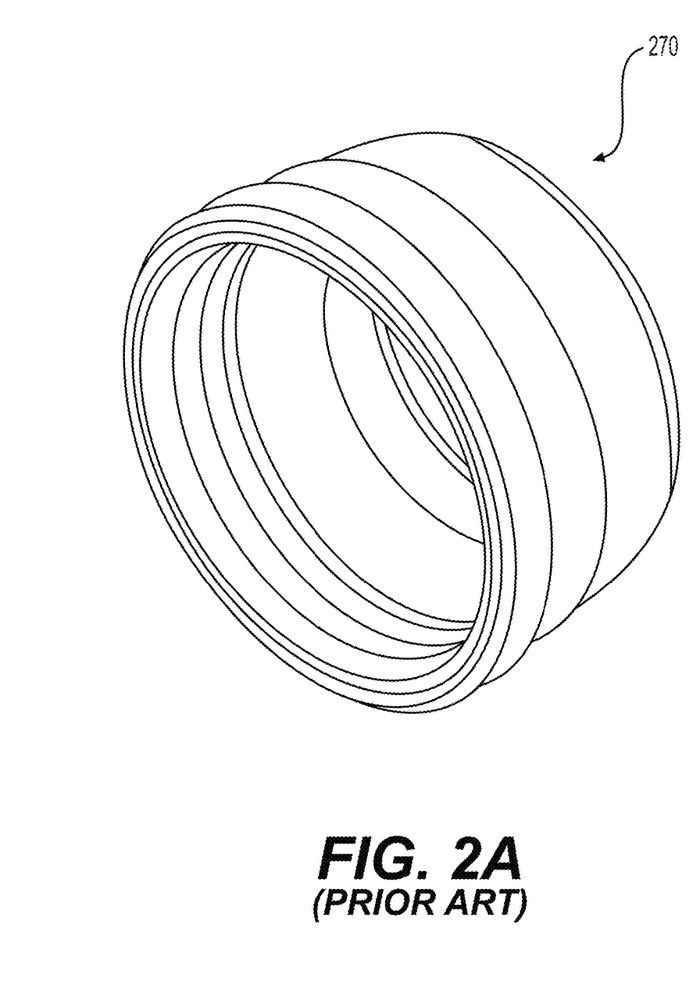
FIGS. 2A and 2B are perspective and side cross-sectional views, respectively, of a conventional coupler seal.
Figure 2B:
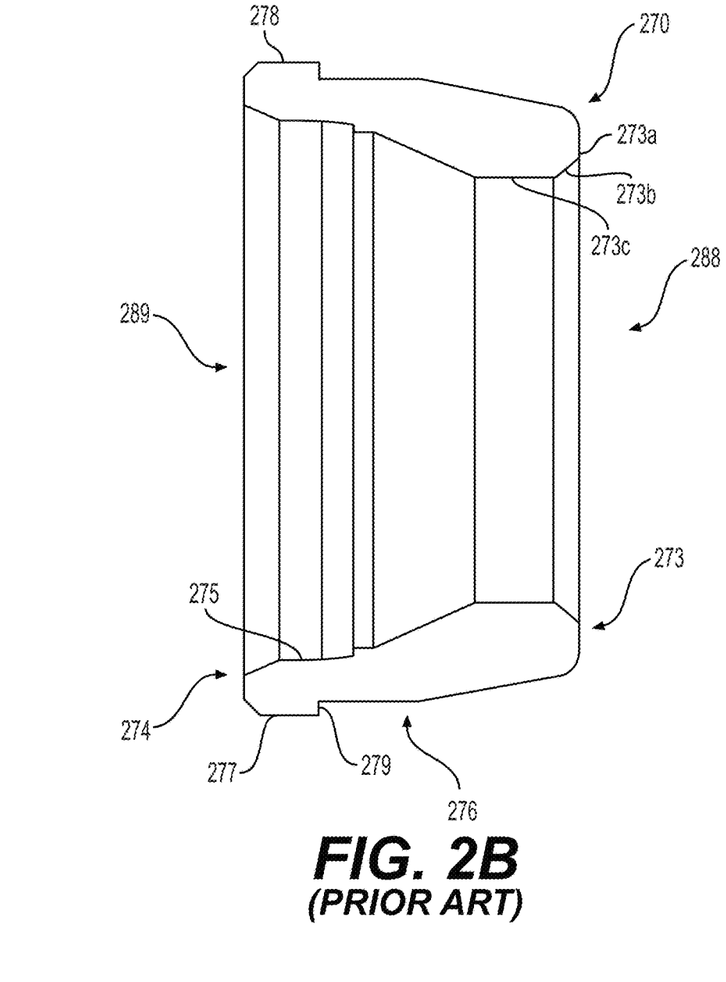
Figure 3:
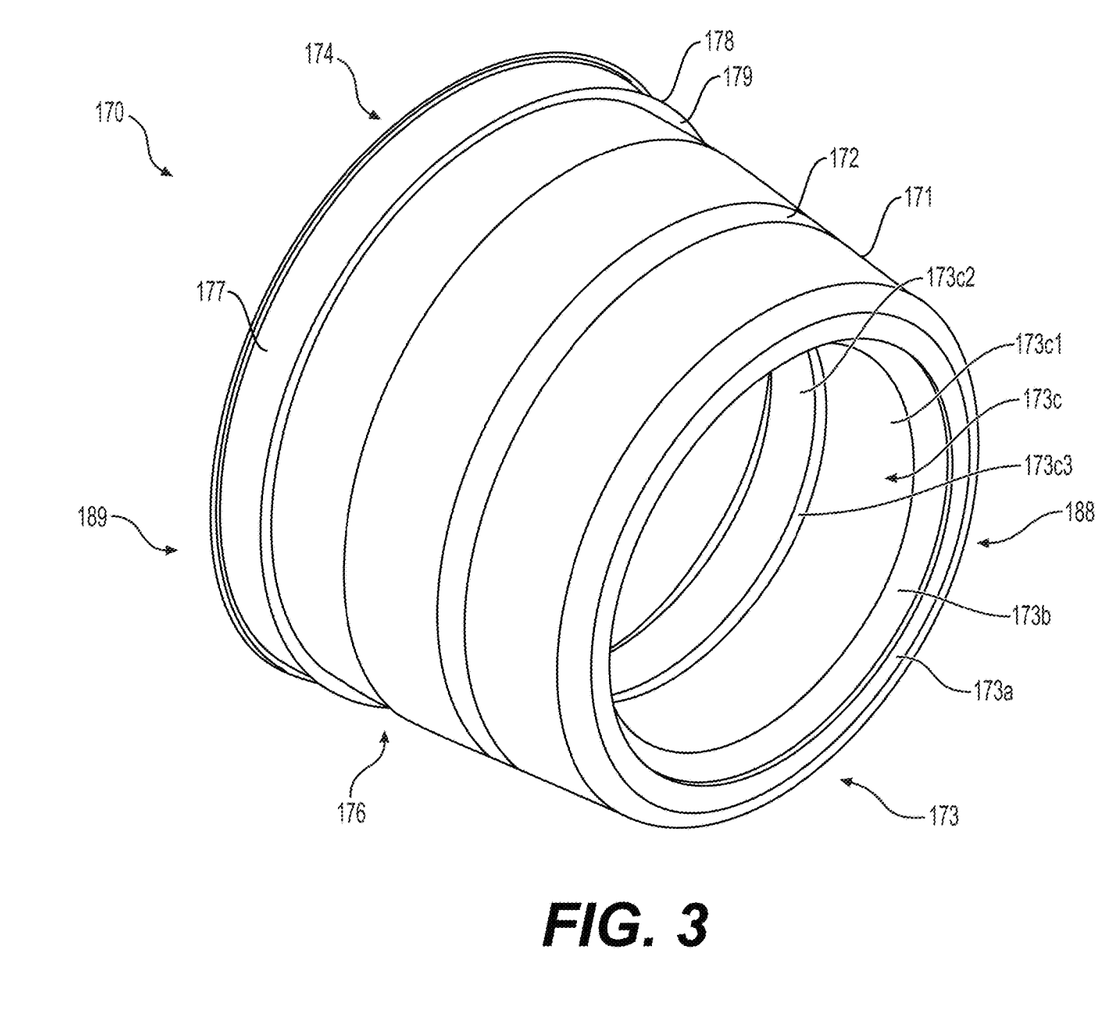
FIG. 3 is a perspective view of an exemplary coupler seal in accordance with various aspects of the disclosure.
Figure 4:
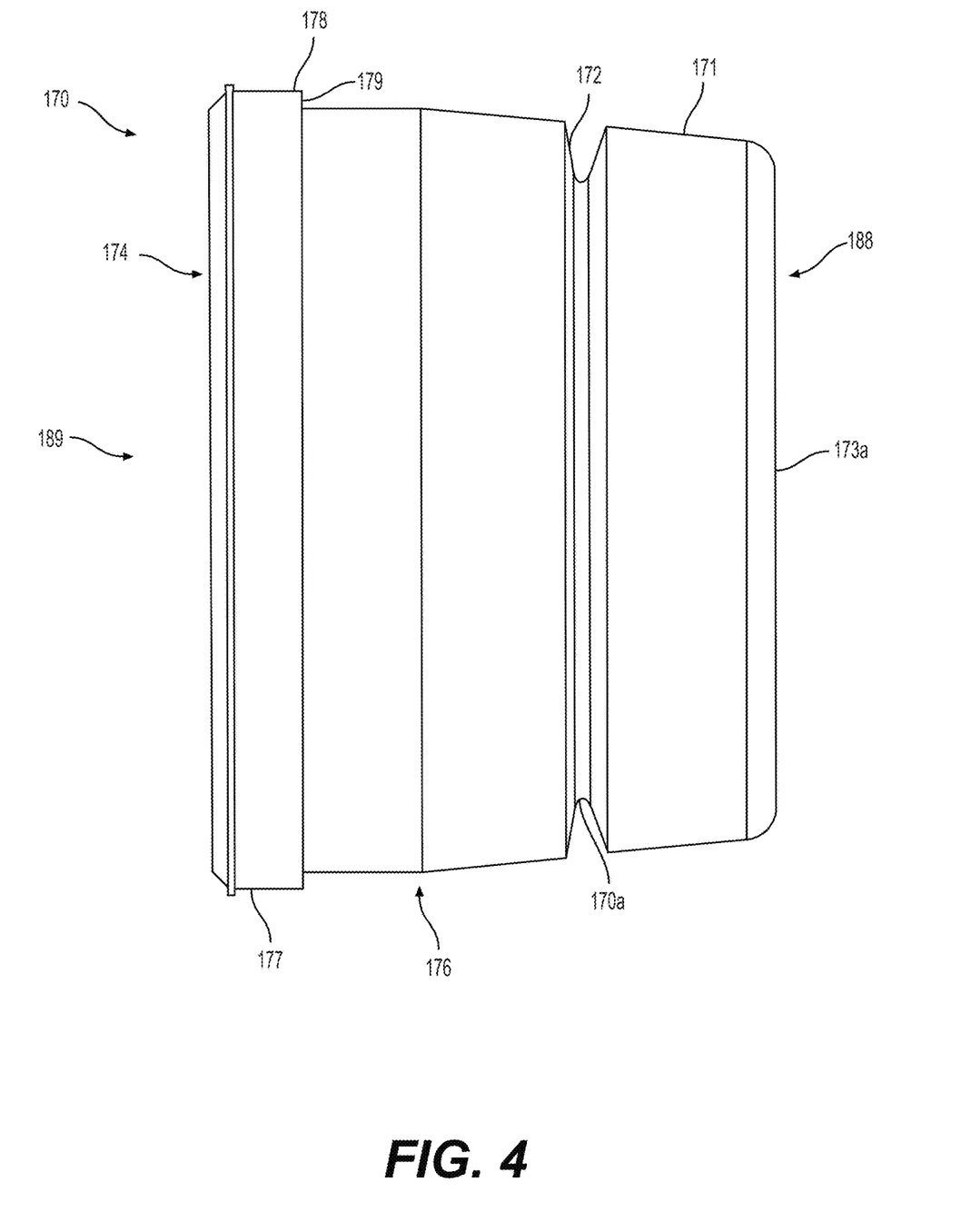
FIG. 4 is a side view of the exemplary coupler seal of FIG. 3.

FIGS. 2A and 2B illustrate a conventional seal 270 for use with a coaxial connector similar to the conventional coaxial connector 100 described above. The seal 270 has a generally tubular body that is elastically deformable by nature of its material characteristics and design. The seal 270 may include a nonconductive elastomer and/or a conductive elastomer.

The body of seal 270 has an anterior end 288 and a posterior end 289. The anterior end 288 is a free end for ultimate engagement with a port, while the posterior end 289 is for ultimate connection to a coupler component (or nut) of a seal assembly. The seal 270 has a forward sealing surface 273, a rear sealing portion 274 including an interior sealing surface 275 that integrally engages the coupler component, and an integral joint-section 276 intermediate the anterior end 288 and the posterior end 289 of the tubular body. The forward sealing surface 273 at the anterior end of the seal 270 may include annular facets 273*a*, 273*b*, and 273*c* to assist in forming a seal with the port. Alternatively, forward sealing surface 273 may be a continuous rounded annular surface that forms effective seals through the elastic deformation of the internal surface and end of the seal compressed against the port.

The integral joint-section 276 includes a portion of the length of the seal which is relatively thinner in radial cross-section to encourage an outward expansion or bowing of the seal upon its axial compression (also referred to as an "accordion effect"), particularly when the seal 270 engages a short interface port. As illustrated, the annular facet 273*c* has a relatively short axial length in comparison with the axial length of the seal 270. Thus, when the seal bows due to the accordion effect, a portion of the facet 273*c* could move radially away from the interface port, thus possibly compromising the effectiveness of the seal 270.

Referring now to FIGS. 3-6, an exemplary coupler seal 170 in accordance with various aspects of the disclosure is illustrated. The coupler seal 170 is configured for use, for example, with a coaxial connector 100' (FIG. 7) similar to the conventional coaxial connector 100 described above.

The seal 170 has a generally tubular body that is elastically deformable by nature of its material characteristics and design. The seal 170 may include a nonconductive elastomer and/or a conductive elastomer. In some embodiments, the nonconductive elastomer may be made of, for example, an elastomeric material having suitable chemical resistance and material stability (i.e., elasticity) over a temperature range between about −40° C. to +40° C. A typical material can be, for example, silicone rubber. Alternatively, the material may be propylene, a typical O-ring material. Other materials known in the art may also be suitable. The interested reader is referred to http://www.applerubber.com for an exemplary listing of potentially suitable seal materials. The conductive elastomer may be an elastomeric material containing conductive fillers such as, for example, carbon, nickel, and/or silver.

The body of seal 170 has an anterior end 188 and a posterior end 189. The anterior end 188 is a free end for ultimate engagement with a port, while the posterior end 189 is for ultimate connection to a coupler or nut of a seal assembly, as described in more detail below. The seal 170 has a forward sealing surface 173, a rear sealing portion 174 including an interior sealing surface 175 that is configured to integrally engage the coupler or nut, and an integral jointsection 176 intermediate the anterior end 188 and the posterior end 189 of the tubular body. The forward sealing surface 173 at the anterior end of the seal 170 may include annular facets 173a, 173b, and 173c to assist in forming a seal with the interface port 20. Although the integral jointsection 176 may include a portion of the length of the seal that is relatively thinner in radial cross-section to encourage an outward expansion or bowing of the seal upon its axial compression (also referred to as an "accordion effect"), such a thinner portion is not necessary because the modular configuration of the seal 170 is designed to facilitate a sealed connection between a connector and both short and long interface ports with such an accordion effect.

Figure 5:
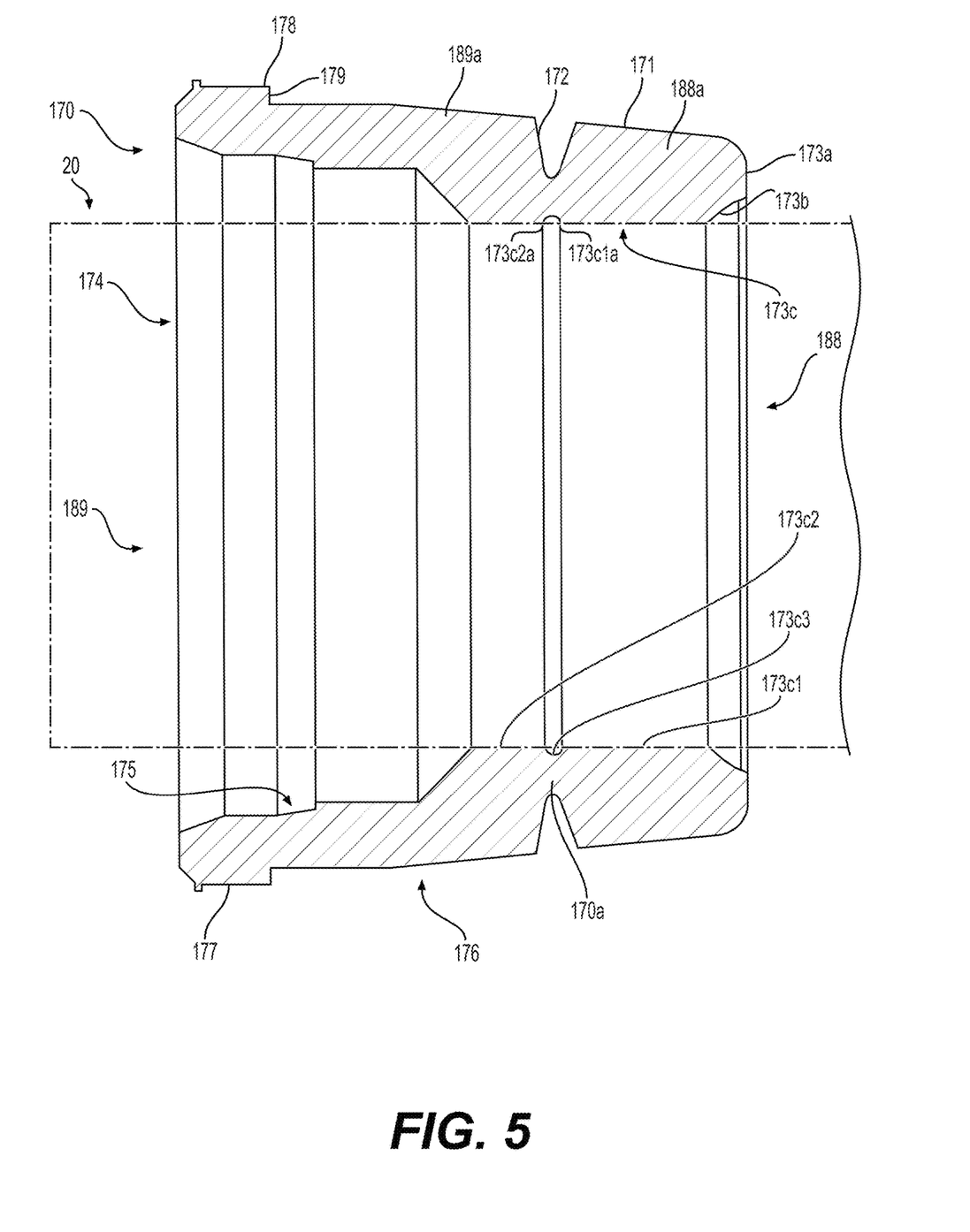
FIG. 5 is a side cross-sectional view of the exemplary coupler seal of FIG. 3 in a first configuration.
Figure 6:
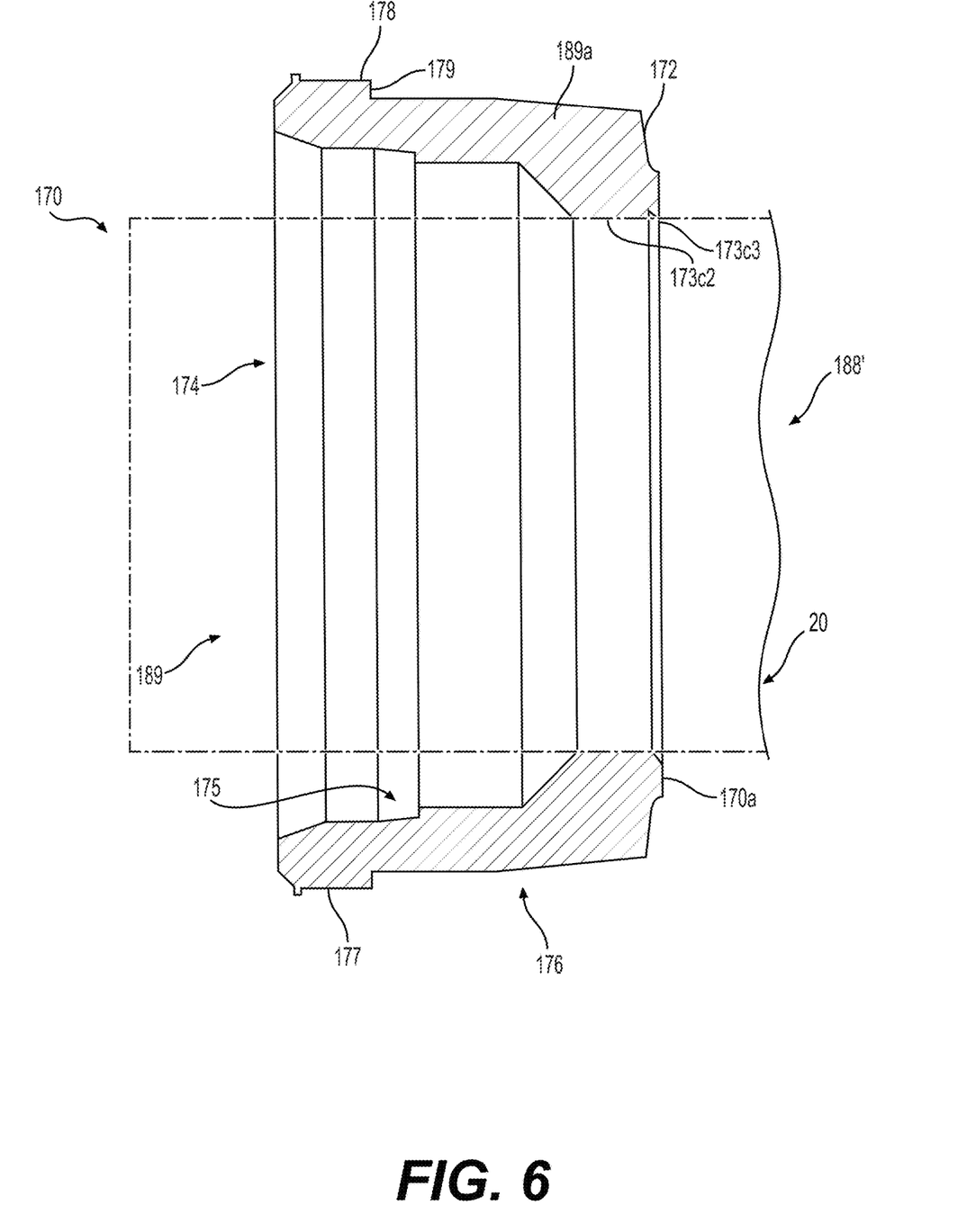
FIG. 6 is a side cross-sectional view of the exemplary coupler seal of FIG. 3 in a second configuration.

The modular configuration of the seal 170 is best illustrated in FIGS. 5 and 6. As shown, the radially inner facet 173c of the seal 170 is elongated in comparison with the radially inner facet 273c of the conventional seal 270. The radially inner facet 173c is divided into a forward portion 173c1 and a rearward portion 173c2 by an inner annular groove 173c3 in the inner facet 173c. The forward portion 173c1 and the rearward portion 173c2 may each include a continuous rounded annular surface that forms an effective seal through the elastic deformation of the internal surface and the end of the seal 170 compressed against the port 20. When the connector 100' is to be used in an application with a long port 20, the forward portion 173c1 and the rearward portion 173c2 of the inner facet 173 are configured to contact the port. For example, in some aspects, the forward portion 173c1 and the rearward portion 173c2 may have the same or substantially the same inner diameter along each of their axial lengths, which is sized slightly smaller than an outer diameter of the interface port 20 such that the elastomeric seal 170 forms effective seals through the elastic deformation of the internal surface and the end of the seal compressed against the port 20.

An outer surface 171 of the seal 170 includes an outer annular groove 172 in the outer surface 171 that is aligned with the inner annular groove 173c3 in a radial direction of the tubular body of the seal 170. The inner annular groove 173c3 and the outer annular groove 172 cooperate to define a radially-thinned neck portion 170a that connects an anterior portion 188a of the seal 170 with a posterior portion 189a of the seal 170.

When the connector 100' is to be used in an application with a short port 20, for example, in many indoor applications, the combined axial lengths of the forward portion 173c1 and the rearward portion 173c2 may be longer than an axial length of the interface port 20, thus leading to the accordion effect bowing of the seal 170 as the connector 100' is coupled with the port. In order to avoid the accordion effect, the anterior portion 188a of the seal 170 can be separated from the posterior portion 189a of the seal 170. For example, the seal 170 can be torn or cut radially along the outer annular groove 172 and the inner annular groove 173c3 at the neck portion 170a. The removed anterior portion 188a can be discarded.

After the anterior portion 188a is removed, the rearward portion 173c2 of the radially inner facet 173c remains and provides a radially-inward sealing edge 173c2a that is configured to cooperate with the outer surface of the short port in order to provide a sealed connection between the connector 100' and the port 20. Also, a radially-extending, forward-facing portion of the neck portion is configured to form an effective seal through the elastic deformation of the end of the seal compressed against the port 20. The inner annular groove 173c3 adjacent the neck portion 170a keeps the torn or cut region of the neck portion 170a, and thus any frayed edges, away from the radially-inward sealing edge 173c2a of the rearward portion 173c2 of the radially inner facet 173c, which provides a more reliable seal between the connector 100' and the port 20 than if the torn or cut region was at the innermost radial surface of the radially inner facet 173c. Similarly, the inner annular groove 173c3 adjacent the neck portion 170a keeps the torn or cut region of the neck portion 170a, and thus any frayed edges, away from a radially-inward sealing edge 173c1a of the forward portion 173c1 of the radially inner facet 173c. In the case of a seal 170 comprising a conductive material, tearing of the seal 170 along the outer annular groove 172 may tear more easily that with some nonconductive materials.

In the case of the conventional seal 270, as illustrated in FIGS. 2A and 2B, a technician would not consider tearing the forward end 288 because doing so may destroy the ability of the seal 270 to form an effective seal with the interface, contrary to the intended operation of the conventional seal 270. Moreover, tearing the conventional seal 270 could lead to non-uniform or inconsistent sealing surfaces, including both the radially-inward and forward-facing surfaces, which could degrade the effectiveness of the seal 270.

Figure 7:
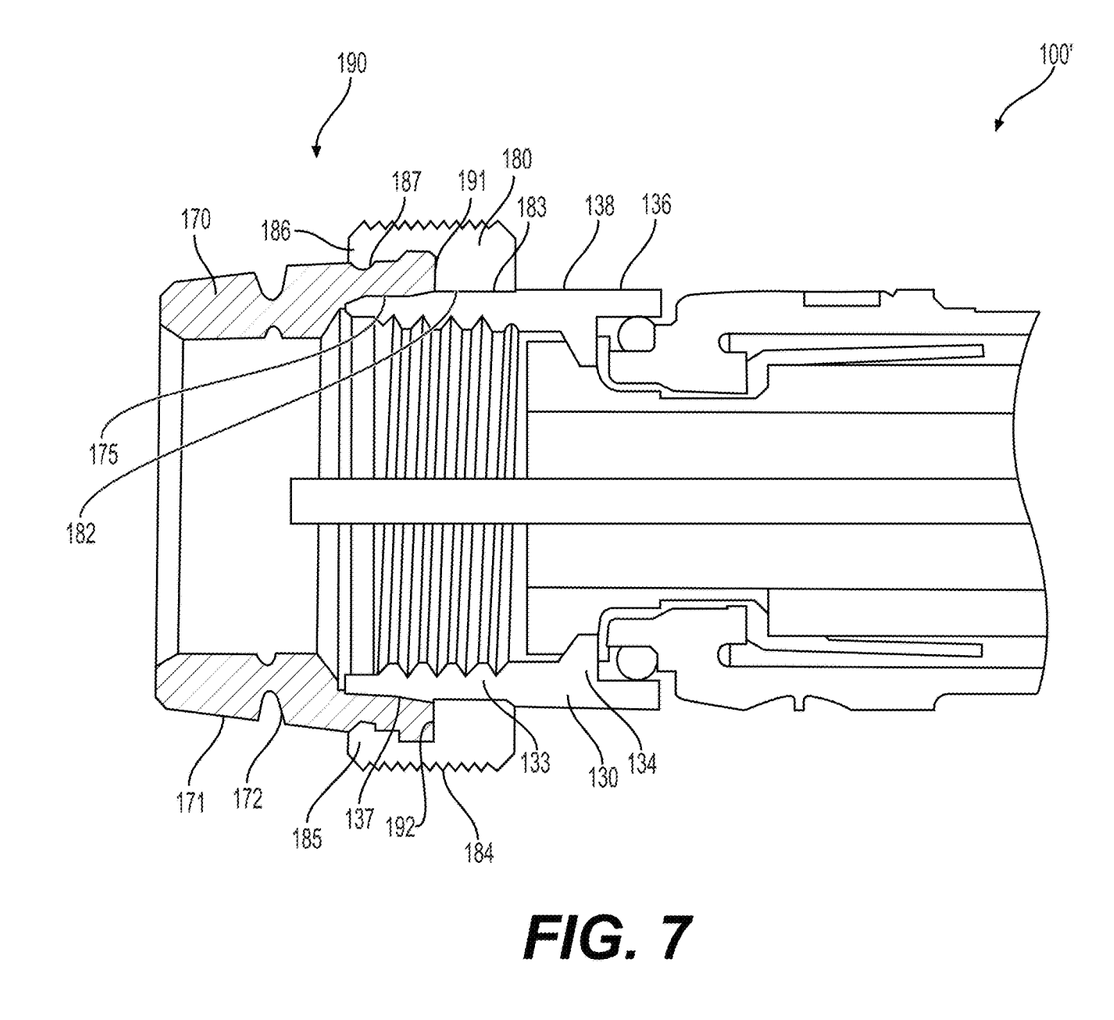
FIG. 7 is a side cross-sectional view of an exemplary coaxial cable connector include a coupler seal assembly that include the exemplary coupler seal of FIG. 3.

Referring now to FIG. 7, in one exemplary embodiment, a seal assembly 190 includes a coupler or nut 130, the seal 170, and a seal ring 180. The nut 130 of the seal assembly 190 has an interior surface, at least a portion 133 of which is threaded, a connector-grasping portion 134 (e.g., a lip), and an exterior surface 136 including a seal-grasping surface portion 137. In an aspect, the seal-grasping surface 137 can be a flat, smooth surface or a flat, roughened surface suitable to frictionally and/or adhesively engage the interior sealing surface 175 of the seal 170. The exterior surface 136 further includes a nut-turning surface portion 138. In some aspects, the nut-turning surface portion 138 may have at least two flat surface regions that allow engagement with the surfaces of a tool such as a wrench. Typically, the nut-turning surface in this aspect will be hexagonal. Alternatively, the nut turning surface may be a knurled surface to facilitate hand-turning of the nut component.

The seal ring 180 of the seal assembly 190 has an inner surface 182 and an outer surface 184. The inner surface 182 includes a posterior portion 183 having a diameter such that the seal ring 180 is slid over the exterior surface 136 of the nut 130 and creates a press-fit against the exterior surface 136 of the nut 130. The rear sealing portion 174 of the seal 170 may include an exterior sealing surface 177 that is configured to integrally engage the seal ring 180. The sealing surface 177 is an annular surface on the exterior of the tubular body. For example, the seal 170 may have a ridge 178 at the posterior end 189 which defines a shoulder 179. The inner surface 182 of the seal ring 180 may include a seal-grasping portion 185. In an aspect, the seal-grasping portion 185 can be a flat, smooth surface or a flat, roughened surface suitable to frictionally and/or adhesively engage the exterior sealing surface 177 of the seal 170. In an aspect, the seal-grasping portion 185 may include a ridge 186 that defines a shoulder 187 that is suitably sized and shaped to engage the shoulder 179 of the ridge 178 of the posterior end 189 of the seal 170 in a locking-type interference fit as illustrated in FIG. 7. Upon engagement of the seal 170 with the seal ring 180, a posterior sealing surface 191 of the seal 170 abuts a side surface 192 of the nut 130 as shown in FIG. 7 to form a sealing relationship in that region.

The modular configuration of the seal 170 enables the connector 100' to be used with various types of ports 20. For example, the connector 100' may be used with a short port (discussed above), a long port, or an alternate long port. A short port refers to a port having a length of external threads that extends from a terminal end of the port to an enlarged shoulder that is shorter than a length that the seal 170, in an uncompressed state, extends beyond a forward end of the nut 130. In the absence of the modular configuration, when connected to a short port, the conventional seal 270 is axially compressed between a forward facing surface of the seal ring and the enlarged shoulder of the short port. A posterior sealing surface of the seal is axially compressed against side surface of nut, and the end face 273a of forward sealing surface 273 is axially compressed against the enlarged shoulder, thus preventing ingress of environmental elements between the nut and the enlarged shoulder of the port 20.

A long port refers to a port having a length of external threads that extends from a terminal end of the port to an unthreaded portion of the port having a diameter that is approximately equal to the major diameter of external threads. The unthreaded portion then extends from the external threads to an enlarged shoulder. The length of the external threads in addition to the unthreaded portion is longer than the length that the seal 170, in an uncompressed state, extends beyond a forward end of the nut 130. When connected to a long port, the seal 170 is not axially compressed between a forward facing surface of the seal ring 180 and the enlarged shoulder of the short port. Rather, the internal sealing surface 175 is radially compressed against the seal grasping surface 137 of the nut 130 by the seal ring 180, and the interior portions 173b and 173c1, 173c2 of the forward sealing surface 173 are radially compressed against the unthreaded portion of the long port, thereby preventing the ingress of environmental elements between the nut 130 and the unthreaded portion of the long port. The radial compression of the forward sealing surface 173 against the unthreaded portion of the port is created by an interference fit. An alternate long port refers to a port that is similar to a long port but where the diameter of the unthreaded portion is larger than the major diameter of the external threads.

It should be understood that, in some aspects, the seal 170 can be coupled with the nut 130 without the use of the seal ring 180. For example, in some aspects, the seal 170 may include an engagement structure that extends radially inward from an inner wall of the seal 170 at or near the posterior end of the seal 170. The engagement structure could be configured to engage a counterpart or complementary engagement structure on or extending from an outer surface of the nut 130 such that the engagement structure of the seal 170 integrally engages the engagement structure of the nut 130. Each or both of the engagement structures may be a flat, smooth surface or a flat, roughened surface suitable for frictional and/or adhesive engagement. In other aspects, the exterior sealing surface 177 of the seal 170 could be configured to engage a counterpart or complementary engagement structure on or extending from an inner radial surface of the nut 130 such that the engagement structure of the seal 170 integrally engages the engagement structure of the nut 130. That is, the posterior end of the seal 170 may be received in the nut 130. Each or both of the engagement structures may be a flat, smooth surface or a flat, roughened surface suitable for frictional and/or adhesive engagement. It should be appreciated that the seal 170 can be coupled with the nut 130 in any known manner, including such arrangement illustrated and described in U.S. Pat. No. 7,500,874, the disclosure of which is incorporated herein by reference.

The accompanying figures illustrate various exemplary embodiments of coaxial cable connectors that provide improved grounding between the coaxial cable, the connector, and the coaxial cable connector interface port. Although certain embodiments of the present invention are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

What is claimed is:

1. A seal comprising:
an elastically deformable tubular body having a sealing portion structurally configured to cooperatively engage an interface port;
wherein the sealing portion comprises a forward portion and a rearward portion;
wherein the forward portion is structurally configured to connect to the rearward portion by an inner annular groove portion;
wherein the forward portion and the rearward portion are structurally configured to be separated by the inner annular groove portion;
wherein the forward portion and the rearward portion are structurally configured to be separated by an outer annular groove portion;
wherein the forward portion comprises a first sealing edge that is structurally configured to cooperate with an outer surface of the interface port; and
wherein the rearward portion comprises a second sealing edge that is structurally configured to cooperate with the outer surface of the interface port to provide a sealed connection between the connector and the interface port when the forward portion of the seal is removed from the seal at the inner annular groove portion, and the inner annular groove portion is configured to keep the inner annular groove portion away from the second sealing edge of the rearward portion of the sealing portion when the forward portion is removed from the seal so as to avoid a poor seal between the second sealing edge and the interface port.

2. The seal of claim 1, wherein the inner annular groove portion and the outer annular groove portion are structurally configured to be aligned in a radial direction of the seal.

3. The seal of claim 1, wherein the second sealing edge is structurally configured to be part of the inner annular groove portion.

4. The seal of claim 1, wherein the inner annular groove portion is structurally configured to facilitate separation of the forward portion from the rearward portion.

5. A seal for providing an enhanced environmental seal between a connector and a port, comprising:
  a sealing portion that is configured to engage a seal engaging connector portion of a connector;
  wherein the sealing portion comprises a forward sealing portion and a rearward sealing portion;
  wherein the forward sealing portion includes an inner annular sealing groove portion that is structurally configured to engage with the rearward sealing portion;
  wherein the forward sealing portion comprises a first sealing edge portion that is structurally configured to cooperate with a seal engaging port portion of an interface port; and
  wherein the rearward sealing portion comprises a second sealing edge portion that is structurally configured to cooperate with the seal engaging port portion so as to provide a sealed connection between the seal engaging connector portion and the interface port even when the forward sealing portion is removed from the inner annular sealing groove portion so as to provide an enhanced seal between the second sealing edge portion and the interface port even when the first sealing edge portion no longer provides a seal between the seal engaging connector portion and the interface port.

6. The seal of claim 5, wherein the seal engaging connector portion comprises a body portion of the connector.

7. The seal of claim 5, wherein the second sealing edge portion is structurally configured to deform when the second sealing edge cooperates with the seal engaging port portion so as to provide the sealed connection between the seal engaging connector portion and the interface port even when the forward sealing portion is removed from the inner annular sealing groove portion so as to provide the enhanced seal between the second sealing edge portion and the interface port even when the first sealing edge portion no longer provides a seal between the seal engaging connector portion and the interface port.

8. The seal of claim 5, wherein the second sealing edge portion is structurally configured to elastically deform when the second sealing edge cooperates with the seal engaging port portion so as to provide the sealed connection between the seal engaging connector portion and the interface port even when the forward sealing portion is removed from the inner annular sealing groove portion so as to provide the enhanced seal between the second sealing edge portion and the interface port even when the first sealing edge portion no longer provides a seal between the seal engaging connector portion and the interface port.

9. The seal of claim 5, wherein the sealing portion is structurally configured to provide a seal around a periphery of the interface port.

10. The seal of claim 5, wherein the seal portion comprises a tubular body portion.

11. The seal of claim 5, wherein the seal engaging port portion comprises an outer port surface.

12. The seal of claim 5, wherein the rearward sealing portion is structurally configured to deform when the rearward sealing portion cooperates with the seal engaging port portion so as to provide the sealed connection between the seal engaging connector portion and the interface port.

13. The seal of claim 5, wherein the rearward sealing portion is structurally configured to elastically deform when the rearward sealing portion cooperates with the seal engaging port portion so as to provide the sealed connection between the seal engaging connector portion and the interface port.

14. The seal of claim 5, wherein the forward sealing portion is structurally configured to be separated from the rearward sealing portion by a separation portion.

15. The seal of claim 5, wherein the separation portion comprises an inner annular groove portion that is structurally configured to facilitate separation of the forward sealing portion from the rearward sealing portion.

* * * * *